Patented Jan. 21, 1947

2,414,540

UNITED STATES PATENT OFFICE 2,414,540

LIQUID COATING COMPOSITIONS AND COATED FIBROUS CONTAINERS

John C. Lum, Union, N. J., assignor to Westinghouse Electric Corporation, East Pittsburgh, Pa., a corporation of Pennsylvania No Drawing. Application December 22, 1943, Serial No. 515,290

5 Claims. (Cl. 229—3.1)

This invention relates to protective compositions that may be applied from a liquid carrier to surfaces of metals and the like, to provide for the protection of the underlying surface from chemical reagents.

In the treatment of metals and other substances with various reagents to produce particular surface conditions, it is frequently necessary to stop-off or prevent the action of the reagents upon certain surface portions of members. Frequently, in treating sheets of metal with acids, alkalies, and other substances to produce a predetermined surface condition, portions of the surface must be shielded from the action of such alkalies and the like in order to maintain them in their original condition.

According to this invention, an organic wax-like composition composed of ethyl cellulose and an alkyl acetamide is applied in the form of a suspension in a liquid carrier to those portions of metal surfaces which are to be protected from the action of various chemical reagents. After removal of the liquid carrier by heating or the like, a deposit or layer of the protective composition is deposited on the metal surface. This layer may be heat-treated to cause fusion and blending into a tough chemically resistant coating.

Among the chemical reagents, whose reaction is successfully withstood by the protective composition, are acids, alkalies and most organic solvents. In addition, the composition may be applied to electroplating holders, racks, tanks, and other members of electroplating systems which are subjected to electrolytes and the effects of electrical current. For example, cyanide electrolyte baths are satisfactorily withstood. The composition prevents the building up of metallic deposits on those portions of the work-holding racks and supports to which it has been applied.

It is desirable that the stop-off or protective composition be readily removable, when desired, from surfaces of metals and the like when the necessity for the protective function is no longer required. The composition should not only be readily removed, but removable without causing any change in the underlying surface as compared to its original condition.

The object of this invention is to provide an easily applied liquid composition comprising a relatively insoluble wax-like compound and a liquid carrier therefor.

A further object of the invention is to provide for applying to members a layer of a wax-like compound from a liquid carrier and fusing the layer into a tough tenacious coating capable of withstanding acids, alkalies and most solvents.

A still further object of the invention is to provide a coated container which may be sterilized by heat treatment.

Other objects of the invention will, in part, be obvious; and will, in part, appear hereinafter.

According to this invention, a highly satisfactory protective composition is prepared by suitably combining ethyl cellulose with an alkyl acetamide. The alkyl groups in the acetamide compound preferably have from 12 to 24 carbon atoms. A particularly satisfactory alkyl acetamide is cetyl acetamide and is available to the trade under the name of "Acrowax C." The ethyl cellulose employed in preparing the composition may have a variable ethoxyl content, preferably from 43% to 50% ethoxyl. Depending upon the requirements, the particular ethoxyl content of the ethyl cellulose is selected for ease of solubility and toughness of film produced therefrom.

In combining the ethyl cellulose and alkyl acetamide, individual solutions of the components are first prepared. For example, 10 grams of ethyl cellulose are dissolved in 45 cc. of toluol and 45 cc. of ethyl alcohol. One-half gram of cetyl acetamide is dissolved in 50 cc. of hot toluol. The two solutions are then mixed. A suspension is produced since the cetyl acetamide is insufficiently soluble in the cold solvents to remain completely dissolved. However, the suspension is so fine that it does not settle out. If the suspension has been standing for a long time, it may be desirable to stir it thoroughly before applying to members.

The respective solutions may be prepared by the use of other solvents than those indicated above. Ethyl cellulose, for example, can be dissolved in a number of solvents, such, for example, as a mixture of 80% benzene and 20% methanol; xylene 80%—butanol 20%; turpentine 70%—butanol 30%; or single solvents such as benzyl alcohol, butyl lactate, butyl cellosolve and acetone. Other suitable solvents for this purpose are known, and need not be detailed further. The cetyl acetamide may be dissolved in other benzenoid solvents, such as xylol.

The proportions of the components of the composition may vary from 0.1% to 20% by weight of the acetamide and from 99.9% to 80% of the ethyl cellulose. Particularly desirable compositions for the practice of the invention contain about 90% of ethyl cellulose and 10% cetyl acetamide.

In some cases, it may be desirable to add small amounts of gums and resins to the two components composition, in order to modify the properties thereof. Organic resins such as Congo gum or Batu resin may be added to replace up to 10% of the ethyl cellulose. Likewise copal shellac and vinyl chloride polymers may be added in some cases up to 10% of the weight of the ethyl cellulose with advantage. The limitation upon the amount of these third components that may be added is based on the lack of compatibility of any large amount or resin with the acetamide. These resins may be dissolved separately and added in solution to the composition.

The solution of the ethyl cellulose and alkyl acetamide suspended in the liquid carrier may be applied to the surfaces to be protected by dipping, spraying through a mask, or brushing. The applied coating is air-dried to remove the liquid carrier, or it may be dried in an oven. The oven temperature should not exceed about 125° C. The dried coating is somewhat porous and must be subjected to temperatures high enough to cause it to melt and blend. Heating to a temperature of about 150° C. for a few minutes will cause the ethyl cellulose and alkyl acetamide to melt and blend into a tenacious and tough coating. If desired, further coatings may be applied to build up to any predetermined thickness.

The heat-treated composition in the form of a coating on the metal surface is highly resistant to boiling alkalies and acids, as well as cold solutions thereof. It can be used as a protective coating for conducting members in practically all plating solutions to prevent undesired electroplating thereon. Likewise tank walls and other portions may be coated to prevent corrosion or chemical deterioration thereof.

When it is desired to remove the protective coating of the composition, it may be treated with a benzenoid hydrocarbon solvent such as benzene which causes the coating to swell after which it may be readily peeled from the entire surface. Therefore, it will be apparent that the coating is not only easily applied, but removed very simply. It is not necessary to scrape it, or employ complicated procedures to remove the coating.

The suspension of ethyl cellulose and acetamide in the liquid carrier may be employed for other useful purposes than simply as a stop-off application. Since the coating has such a high melting temperature, the suspension may be employed as a means of coating a base material, such as paper, cardboard, wood and textiles, for example, to provide thereon a predetermined coating. A flashing heat treatment may be applied to just melt the composition without adversely affecting the base material as would occur if paper, for instance, were dipped into a molten bath of the ethyl cellulose and acetamide composition. Successful application to such base materials from a molten bath would not be feasible due to the extreme viscosity and other factors.

A particularly useful application for the ethyl cellulose and acetamide composition suspended in a liquid carrier is for making paper receptacles such as are used for beverages, drugs, foods and the like. After sheets of paper or cardboard have been coated with the suspension, the liquid carrier is removed and the wax-like deposit flash heated for a few seconds in an oven to cause melting. The treated base material may be formed into receptacles and shipped to creameries, packing establishments and the like for use.

Unlike most wax treated containers, the containers of the present invention can be sterilized by appropriate heat treatment immediately prior to filling with beverages or foods. Temperatures at which sterility can be assured will not cause the ethyl cellulose and acetamide to melt or soften. The joints will remain liquid tight during and after heating to sterilization temperatures. The receptacles or containers may carry an aperture which can be sealed by applying a separate coated cap or by means of a tab cut out therefrom. After filling, the cap or tab can be sealed by disposing the cap or tab at the aperture and applying a heated member with pressure to cause the composition to melt. Upon cooling an airtight seal is secured.

Since certain changes can be made in the above invention and different embodiments of the invention can be made without departing from the scope thereof, it is intended that all matter contained in the above description shall be interpreted as illustrative and not in a limiting sense.

I claim as my invention:

1. A liquid composition for application to members to provide a protective coating thereon comprising, in combination, a liquid carrier and a suspension of from 0.1% to 20% by weight of cetyl acetamide and from 80% to 99.9% of ethyl cellulose having from 43 per cent to 50 per cent ethoxyl content in the carrier.

2. A liquid composition for application to members to provide a protective coating thereon comprising, in combination, a liquid carrier and a suspension of from 0.1% to 20% by weight of an alkyl acetamide in which the alkyl group has from 12 to 24 carbon atoms and from 80% to 99.9% of ethyl cellulose having from 43 per cent to 50 per cent ethoxyl content in the carrier.

3. A liquid coating composition for application to members to provide a protective coating thereon comprising, in combination, a liquid carrier, a suspension composed of from 1% to 20% by weight of an alkyl acetamide in which the alkyl group has from 12 to 24 carbon atoms, 70% to 99% of ethyl cellulose having from 43 per cent to 50 per cent ethoxyl content and less than 10% of a compatible organic resin having a melting temperature of above 135° C., the liquid carrier including solvents for the components of the suspension.

4. A container which can be sterilized by heating without adverse effects, comprising in combination, a fibrous material and an impregnating coating comprising at least 70 per cent ethyl cellulose having from 43 per cent to 50 per cent ethoxyl content and up to 20 per cent by weight of an alkyl acetamide in which the alkyl group has from 12 to 24 carbon atoms.

5. A receptacle for receiving perishable products comprising a combination, a fibrous base material disposed in predetermined configuration to form a receptacle with an aperture, a closure means for the aperture, and a composition comprising a major proportion of ethyl cellulose having from 43 per cent to 50 per cent ethoxyl content and up to 20 per cent by weight of an alkyl acetamide in which the alkyl group comprises from 12 to 24 carbon atoms, the composition coating and impregnating the container and closure to render the container fluid tight, the container being sterilizable by suitable heat-treatment without the composition melting.

JOHN C. LUM.